United States Patent
Minhas

(10) Patent No.: US 8,508,787 B2
(45) Date of Patent: Aug. 13, 2013

(54) SYSTEM AND METHOD FOR AUTOMATIC TRANSLATION OF DOCUMENTS SCANNED BY MULTIFUNCTIONAL PRINTER MACHINES

(75) Inventor: Rajinderjeet Singh Minhas, Churchville, NY (US)

(73) Assignee: Xerox Corporation, Norwalk, CT (US)

( * ) Notice: Subject to any disclaimer, the term of this patent is extended or adjusted under 35 U.S.C. 154(b) by 803 days.

(21) Appl. No.: 12/623,650

(22) Filed: Nov. 23, 2009

(65) Prior Publication Data

US 2011/0122448 A1 May 26, 2011

(51) Int. Cl.
*G06K 15/00* (2006.01)

(52) U.S. Cl.
USPC .......... 358/1.18; 358/448; 704/2; 704/3

(58) Field of Classification Search
USPC ....................................... 358/1.18
See application file for complete search history.

(56) References Cited

U.S. PATENT DOCUMENTS

| | | | |
|---|---|---|---|
| 4,751,740 A | 6/1988 | Wright | |
| 5,373,441 A | 12/1994 | Hirai et al. | |
| 5,848,386 A | 12/1998 | Motoyama | |
| 2003/0065499 A1 | 4/2003 | Carter | |
| 2006/0245005 A1* | 11/2006 | Hall et al. | 358/448 |
| 2008/0300880 A1* | 12/2008 | Gelbman | 704/256 |
| 2009/0089172 A1* | 4/2009 | Quinlan et al. | 705/17 |

* cited by examiner

*Primary Examiner* — Marivelisse Santiago Cordero
*Assistant Examiner* — Aaron R Gerger
(74) *Attorney, Agent, or Firm* — MH2 Technology Law Group LLP

(57) ABSTRACT

A method and system for translating documents with the use of a multifunctional printer machine, including capturing an image of a document; determining regions of the document captured that include original text; performing optical character recognition of the regions of the document captured that include the original text; specifying a source language corresponding to the original text; specifying one or more target languages corresponding to translated text; performing language translation of the original text into translated text; selecting one or more page layout templates having multiple pre-designated areas for receiving the original text and the translated text; and outputting one or more printouts in accordance with the one or more page layout templates selected, including at least an area designating (i) the original text in the source language and (ii) the translated text in the one or more target languages.

18 Claims, 2 Drawing Sheets

SYSTEM AND METHOD FOR AUTOMATIC TRANSLATION OF DOCUMENTS SCANNED BY MULTIFUNCTIONAL PRINTER MACHINES

BACKGROUND

1. Field of the Related Art

The present disclosure relates to language translation systems, and more particularly, to a multifunctional printer device having automatic language translation capabilities and automatic formatting of the translation capabilities.

2. Background of the Related Art

In many office environments, there is a need to process information and documents in foreign languages or to communicate with correspondents in a foreign language. Prior to the growth of information technology (IT), translating documents required the services of an individual knowledgeable in both the source and target languages. More recently, computerized translation has become available, allowing the production of machine translations. While technological advances have placed many language resources within reach of a typical computer user, obtaining a translation of a printed document typically still involves multiple stages and requires accessing several independent resources.

Additionally, it has become common for printing systems to incorporate additional functionality, generally by the inclusion of a scanner. These "multifunction" or "All-in-One" systems allow a user to print, scan, copy, and/or fax documents. The desired function may typically be selected from a control panel on the printing system, or through a software menu structure. Typical control panels may comprise hardwired buttons or controls, or may comprise liquid crystal displays (LCDs) that may or may not be touch-sensitive. Such displays normally provide graphical representations of various selectable features, for instance buttons that the user may select by either touching the display with one's finger or scrolling through the features using an actual control panel button.

SUMMARY

It is an aspect of the present disclosure to provide a system for translating documents having a multifunctional printer machine including a processor; a computer-readable storage medium in communication with the processor, the computer-readable storage medium comprising one or more programming instructions for: capturing an image of a document; determining regions of the document captured that include original text; performing optical character recognition of the regions of the document captured that include the original text; specifying a source language corresponding to the original text directly on the multifunctional printer machine; specifying one or more target languages corresponding to translated text directly on the multifunctional printer machine; performing language translation of the regions of the document captured that include the original text into translated text in accordance with the source language specified and the one or more target languages specified; selecting one or more page layout templates directly on the multifunctional printer machine, the one or more page layout templates having multiple pre-designated areas for receiving the original text and the translated text; and outputting one or more printouts in accordance with the one or more page layout templates selected, including at least an area designating (i) the original text in the source language as specified and (ii) the translated text in the one or more target languages as specified.

It is another aspect of the present disclosure to provide a method for translating documents with the use of a multifunctional printer machine including capturing an image of a document; determining regions of the document captured that include original text; performing optical character recognition of the regions of the document captured that include the original text; specifying a source language corresponding to the original text directly on the multifunctional printer machine; specifying one or more target languages corresponding to translated text directly on the multifunctional printer machine; performing language translation of the regions of the document captured that include the original text into translated text in accordance with the source language specified and the one or more target languages specified; selecting one or more page layout templates directly on the multifunctional printer machine, the one or more page layout templates having multiple pre-designated areas for receiving the original text and the translated text; and outputting one or more printouts in accordance with the one or more page layout templates selected, including at least an area designating (i) the original text in the source language as specified and (ii) the translated text in the one or more target languages as specified.

The present disclosure also provides a computer-readable medium which stores programmable instructions configured for being executed by at least one processor for performing the methods described herein according to the present disclosure. The computer-readable medium may include flash memory, CD-ROM, a hard drive, etc.

BRIEF DESCRIPTION OF THE DRAWINGS

Various embodiments of the present disclosure will be described herein below with reference to the figures wherein.

DETAILED DESCRIPTION

Figure 1:
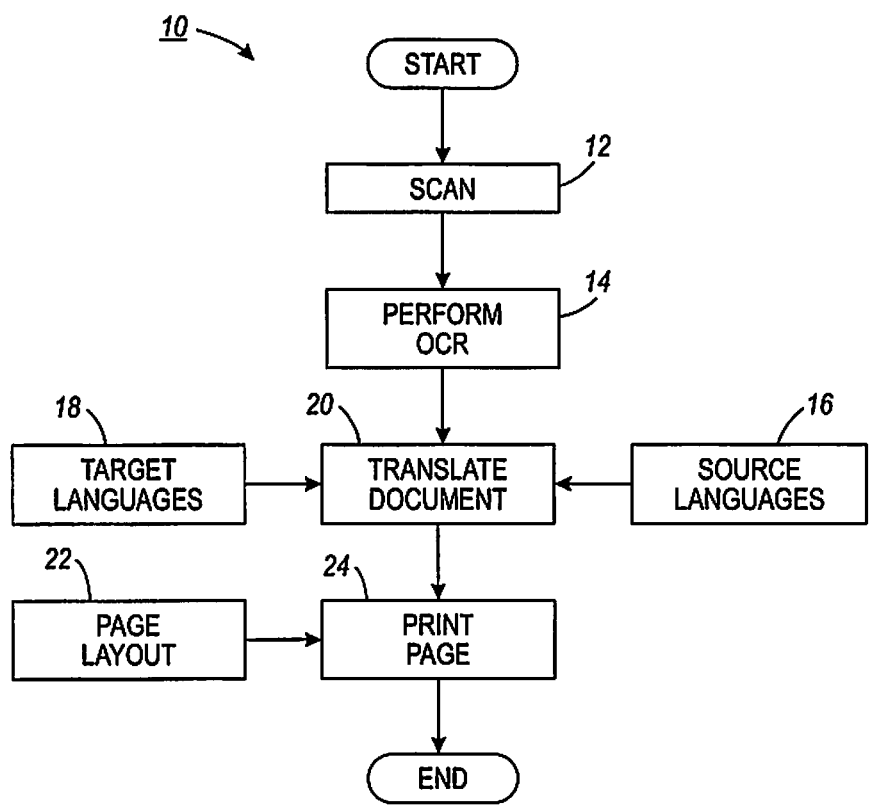
FIG. 1 is a flowchart illustrating performing automatic document translation via a multifunctional printer machine, in accordance with the present disclosure.

It would be highly advantageous to employ multifunctional printer machines to provide new and enhanced auto-translation capabilities with automated formatting of the translation. Thus, there is a need for systems and methods that simplify the process of obtaining machine translations of printed documents in an office setting.

In the following detailed description, example embodiments disclosing specific details are set forth in order to provide an understanding of the present disclosure. The example embodiments are set forth for purposes of explanation and not limitation. Those of ordinary skill in the art will understand that various changes in form and details may be made to the example embodiments without departing from the scope of the present disclosure. Moreover, descriptions of well-known devices, methods, systems, and protocols may be omitted so as to not obscure the description of the example embodiments. Nonetheless, such devices, methods, systems and protocols that are within the purview of those of ordinary skill in the art are contemplated by the example embodiments.

The present disclosure provides a convenience mode for multifunctional devices (MFDs) that combines optical character recognition (OCR) and automatic machine translation (MT) to provide for an auto-translation capability. Additionally, the present disclosure provides a plurality of layout templates that may be chosen to design the final page. This has the effect of providing green button convenience for automatically translating documents by placing a stack of documents on the duplexing automatic document feeder (DADF) of an MFD, choosing the source and target languages, choosing a layout for the output pages and pressing a button to receive the output.

The present disclosure further proposes a convenience mode for MFDs that captures a document in one language, translates the document text to a second language and prints both the original and the translated version of the document in a user selected format. This process would utilize existing image to text conversion services (e.g., OCR), natural language text machine translation services and the result would be printed using a template. The exemplary embodiments of the present disclosure address the need for the multilingual presentation of content in locales that mandate notification in multiple languages (e.g., such as in Canada or India).

Prior to describing the present disclosure in further detail, it will first be helpful to define various terms that will be used throughout the following discussion. For example:

The term "image" may refer to a picture or text scanned by a multifunctional printer device. The term "image" may also refer to still images (static images) or moving images, such as movies, videos, etc. The term "image" may refer to any type of visual data or information scanned by the multifunctional printer device.

The term "document" may refer to a writing that provides information, the writing including text and/or images. The term "document" may include a text file, a Web page, a newsgroup posting, a picture, media, hyperlinks, etc. The document may, for example, include several areas consisting of text, and other areas consisting of images or graphics. The text, for example, may include narrative sections of some length, as well as titles and captions.

With reference to FIG. 1, a flowchart illustrating performing automatic document translation via a multifunctional printer machine, in accordance with the present disclosure is presented.

In FIG. 1, the flowchart 10 includes the following steps. In step 12, a document is scanned by a multifunctional printer device. In step 14, optical character recognition is performed by the multifunctional printer device on the scanned document. In step 16, a source language is selected/specified by a user directly on the multifunctional printer device. In step 18, one or more target languages are selected/specified by the user directly on the multifunctional printer device. In step 20, the document is translated directly by the multifunctional printer device from the source language to one or more target languages. In step 22, the user selects/specifies a page layout template from a plurality of available page layout templates. In step 24, the user prints the translated document as well as the original text scanned in the source language. The process then ends.

As a result, translating a paper document entails first digitally acquiring the document, then identifying portions of the document containing text, applying optical character recognition (OCR) to the text portions, translating the recognized text, formatting the translated text on a document template selected by the user, and printing the newly-translated document, as well as the original text (e.g., on a single page or on multiple pages). Of course, only a select portion of a document may be printed.

Converting a paper document into a form that may then be digitally processed is typically performed by a digital scanner. Once in a digital form, the document is processed by the multifunctional printer device, where the region of interest may be selected and the optical character recognition performed. Once converted to text, a language program may be used to translate the document. OCR and language translation may be performed directly on the multifunctional printer device.

In an embodiment of the present disclosure, a multifunctional printer machine may include a button, which initiates language translation. Alternative, multiple buttons may be used, such as separate buttons to initiate translations to different languages. If the user places a document to be translated on the scanning portion of the multifunctional printer device and presses the "translation" button, embodiments of the present disclosure include scanning the input document, identifying text portions of the document, converting the imaged text to alphanumeric text, translating the alphanumeric text, reformatting the document based on user preferences and printing the result on a single page or on multiple pages incorporating both the original text and the translated text.

Additionally, the multifunctional printer device may include one or more panels or menu settings that may include a display for displaying menu options, and an array of buttons for navigating through the menus. The panel may further include dedicated buttons for selecting copy and print options. A menu structure may be a subset of a larger menu that includes options for other functions, such as faxing. The "Translation Settings" may include the ability to specify "source" and "target" languages, for example, to improve the translation quality and reduce translation time or the ability to specify that the system attempt to "auto recognize" the source language. Exemplary embodiments of the present disclosure may also allow the OCR and translation resources to be specified, such as by identifying an external source, such as an IP address or website, to perform the translation. The menus may include options pertaining to the formatting of the output document, such as, for example, whether the identified regions (e.g., specified portions) of text and images of the original document are preserved in the translated document, or whether a text only output is desired (e.g., either of the full document or a partial version of the document).

Figure 2:
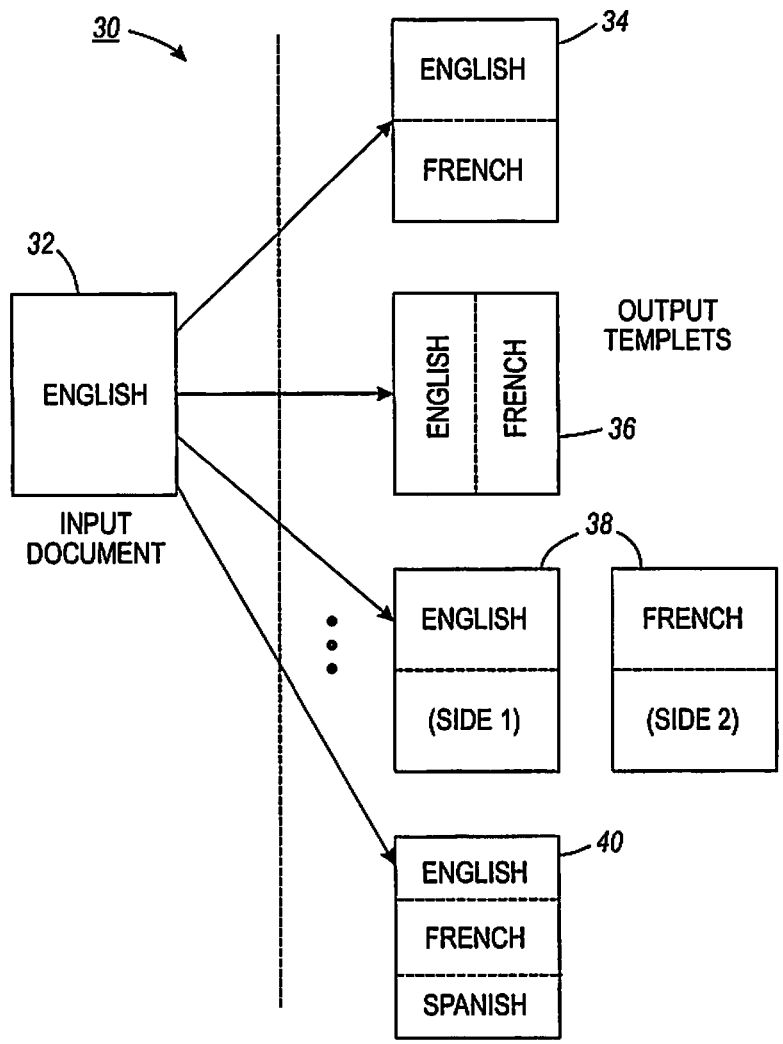
FIG. 2 is a diagram illustrating performing automatic formatting of the translation of the document scanned by the multifunctional printer device, in accordance with the present disclosure.

With reference to FIG. 2, a diagram illustrating performing automatic formatting of the translation of the document scanned by the multifunctional printer device, in accordance with the present disclosure is presented.

In FIG. 2, the diagram 30 includes the following options for the user of the multifunctional printer machine. The input document 32 may be in English language. The output documents may be printed in a plurality of different formats depending on the template selected/specified by the user. For example, a first format 34 may include printing the document 32 in English and in French, where the English version is oriented on the top of the document and the French version is oriented on the bottom of the document, both versions in a portrait orientation format. In an alternate embodiment, a second format 36 may include printing the document 32 in English and in French, where the English version is oriented on the left of the document and the French version is oriented on the right of the document, both versions in a landscape orientation format. In an alternate embodiment, a third format 38 may include printing the English version on one side of one sheet and the French version on the other side of the same sheet. Of course, the English version may be printed on a separate sheet than the French version. In an alternate embodiment, a fourth format 40 may include printing the original scanned text into three different languages on the same printout.

One skilled in the art may contemplate printing original text of a document in a plurality of different configurations in a plurality of different languages. One skilled in the art may also contemplate printing a portion of a scanned document in a plurality of different languages. Moreover, page orientation, as used in this context, is the way in which a rectangular page is oriented for normal viewing. The two most common types of orientation are portrait and landscape. Thus, the output may be customized by using a plurality of different page layout templates stored on the multifunctional printer device.

In summary, exemplary embodiments of the present disclosure include multifunctional (or "All-in-One") printing devices that include the capabilities of scanning and printing documents, and which also allow for the creation of machine translations of documents without additional intervention by the user. The machine translations may rely on local optical character recognition and language translation capabilities within the device itself, or may utilize remote resources. As a result, the exemplary embodiments provide methods of translating printed documents which greatly reduce the actions necessary by the user. The user, for example, may only need to place the document on the multifunctional printer device, press "translate," and receive the final printed output in any desired format he/she chooses. Thus, a translation may be produced with no greater effort than that required to produce a photocopy.

The exemplary multifunctional printing system may be connected, either directly or wirelessly, to a local computing device, which may comprise a personal computer (PC) or a remote computing device, which may comprise a server, via a network. In addition, the local computing device may further provide a means for displaying options to the user. Where used, the network typically comprises one or more sub-networks that are communicatively coupled to each other. By way of example, these networks may include one or more local area networks (LANs) and/or wide area networks (WANs).

The language translation software program may be packaged and distributed as a software package for downloading to the multifunctional printer device where the set of programmable instructions are stored within at least one computer-readable medium, such as a CD-ROM, diskette, etc. The language translation software program may also be downloaded to the multifunctional printer device through a network connection connecting the multifunctional printer device to a remote computer station, such as a remote server.

Various programs have been described herein. It is to be understood that these programs may be stored on any computer-readable medium for use by or in connection with any computer-related system or method. In the context of this document, a computer-readable medium is an electronic, magnetic, optical, or other physical device or means that may contain or store a computer program for use by or in connection with a computer-related system or method. The disclosed programs may be embodied in any computer-readable medium for use by or in connection with an instruction execution system, apparatus, or device, such as a computer-based system, processor-containing system. In the context of the present disclosure, a "computer-readable medium" may be any means that may store, communicate, propagate, or transport the program for use by or in connection with the multifunctional printer device.

Further, although aspects of the present disclosure have been described herein in the context of several particular implementations in particular environments for particular purposes, those of ordinary skill in the art will recognize that its usefulness is not limited thereto and that the present disclosure may be beneficially implemented in any number of environments for any number of purposes.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for translating documents with the use of a multifunctional printer machine, the method comprising:
   capturing an image of a document;
   determining regions of the document captured that include original text;
   performing optical character recognition of the regions of the document captured that include the original text;
   determining a source language corresponding to the original text directly on the multifunctional printer machine;
   displaying a plurality of target languages on the multifunctional printer machine;
   receiving a selected target language from a user in response to the displaying the plurality of target languages on the multifunctional printer machine, wherein the selected target language is selected from the plurality of target languages;
   performing language translation of the regions of the document captured that include the original text into translated text in accordance with the source language and the selected target language;
   displaying a plurality of page layout templates on the multifunctional printer machine;
   receiving one or more page layout templates from the user in response to the displaying the plurality of page layout templates on the multifunctional printer machine, wherein the one or more page layout templates are selected from the plurality of page layout templates, the one or more page layout templates having multiple pre designated areas for receiving the original text and the translated text; and
   outputting one or more printouts in accordance with the one or more page layout templates, the one or more printouts comprising (i) the original text in the source language and (ii) the translated text in the selected target language.

2. The method according to claim 1, wherein displaying the plurality of target languages on the multifunctional printer machine and displaying the plurality of page layout templates on the multifunctional printer machine comprise utilizing a menu setting of the multifunctional printer machine.

3. The method according to claim 1, wherein a template of the one or more page layout templates includes splitting the original text and the translated text into a plurality of portrait orientation areas on a single printout.

4. The method according to claim 1, wherein a template of the one or more page layout templates includes splitting the original text and the translated text into two landscape orientation areas on a single printout.

5. The method according to claim 1, wherein a template of the one or more page layout templates includes splitting the template into three areas on a single printout, a first area including the original text in a first language, a second area including the translated text in a second language, and a third area including the translated text in a third language.

6. The method according to claim 1, wherein outputting the one or more printouts in accordance with the one or more page layout templates further comprises outputting a first printout including the original text in the source language and a second printout including the translated text in the selected target language.

7. The method according to claim 1, wherein performing language translation of the regions of the document captured comprises executing optical character recognition to select text portions of the document captured.

8. The method according to claim 7, further comprising translating a first select text portion of the document into a first language and a second select text portion of the document into a second language.

9. The method according to claim 1, further comprising wirelessly transmitting the one or more printouts to an external source.

10. A system for translating documents having a multifunctional printer machine, the system comprising:
   a processor;
   a computer-readable storage medium in communication with the processor, the computer-readable storage medium comprising one or more programming instructions for:
      capturing an image of a document;
      determining regions of the document captured that include original text;
      performing optical character recognition of the regions of the document captured that include the original text;
      determining a source language corresponding to the original text directly on the multifunctional printer machine;
      displaying a plurality of target languages on the multifunctional printer machine;
      receiving a selected target language from a user in response to the displaying the plurality of target languages on the multifunctional printer machine, wherein the selected target language is selected from the plurality of target languages;
      performing language translation of the regions of the document captured that include the original text into translated text in accordance with the source language and the selected target language;
      displaying a plurality of page layout templates on the multifunctional printer machine;
      receiving one or more page layout templates from the user in response to the displaying the plurality of page layout templates on the multifunctional printer machine, wherein the one or more page layout templates are selected from the plurality of page layout templates, the one or more page layout templates having multiple pre designated areas for receiving the original text and the translated text; and
      outputting one or more printouts in accordance with the one or more page layout templates, the one or more printouts comprising (i) the original text in the source language and (ii) the translated text in the selected target language.

11. The system according to claim 10, wherein displaying the plurality of target languages on the multifunctional printer machine and displaying the plurality of page layout templates on the multifunctional printer machine comprise utilizing a menu setting of the multifunctional printer machine.

12. The system according to claim 10, wherein a template of the one or more page layout templates includes splitting the original text and the translated text into a plurality of portrait orientation areas on a single printout.

13. The system according to claim 10, wherein a template of the one or more page layout templates includes splitting the original text and the translated text into two landscape orientation areas on a single printout.

14. The system according to claim 10, wherein a template of the one or more page layout templates includes splitting the template into three areas on a single printout, a first area including the original text in a first language, a second area including the translated text in a second language, and a third area including the translated text in a third language.

15. The system according to claim 10, wherein outputting the one or more printouts in accordance with the one or more page layout templates further comprises outputting a first printout including the original text in the source language and a second printout including the translated text in the selected target language.

16. The system according to claim 10, wherein performing language translation of the regions of the document captured comprises executing optical character recognition to select text portions of the document captured.

17. The system according to claim 16, further comprising translating a first select text portion of the document into a first language and a second select text portion of the document into a second language.

18. The system according to claim 10, further comprising wirelessly transmitting the one or more printouts to an external source.

* * * * *